March 31, 1936.　　　　S. HAMMER　　　　2,036,044
ADJUSTABLE MOUNTING FOR ELECTRICAL CIRCUIT CUT-OUT OR METER PANELS
Filed Feb. 11, 1931　　2 Sheets-Sheet 1
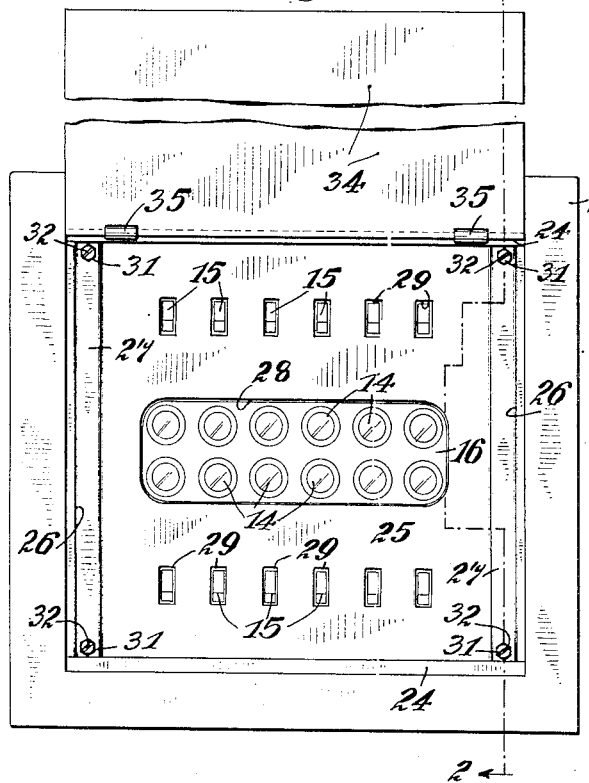
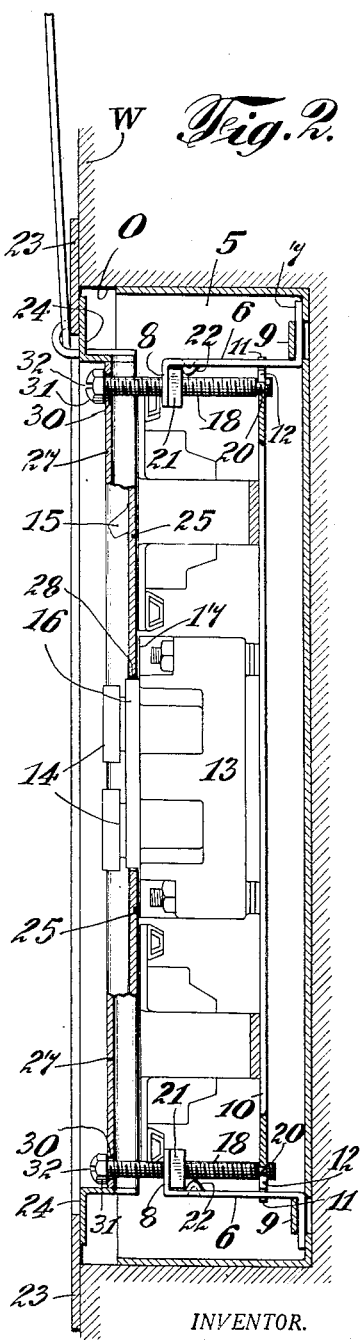
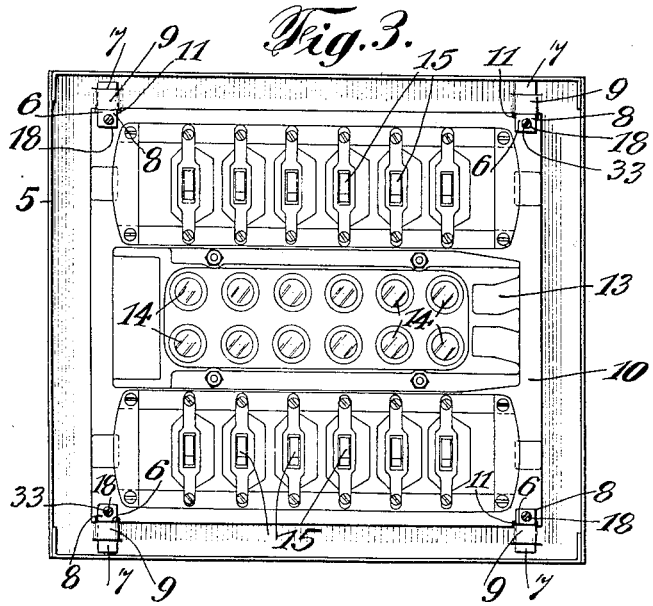
INVENTOR.
Samuel Hammer
BY C. P. Goepel
his ATTORNEY March 31, 1936.  S. HAMMER  2,036,044
ADJUSTABLE MOUNTING FOR ELECTRICAL CIRCUIT CUT-OUT OR METER PANELS
Filed Feb. 11, 1931  2 Sheets-Sheet 2
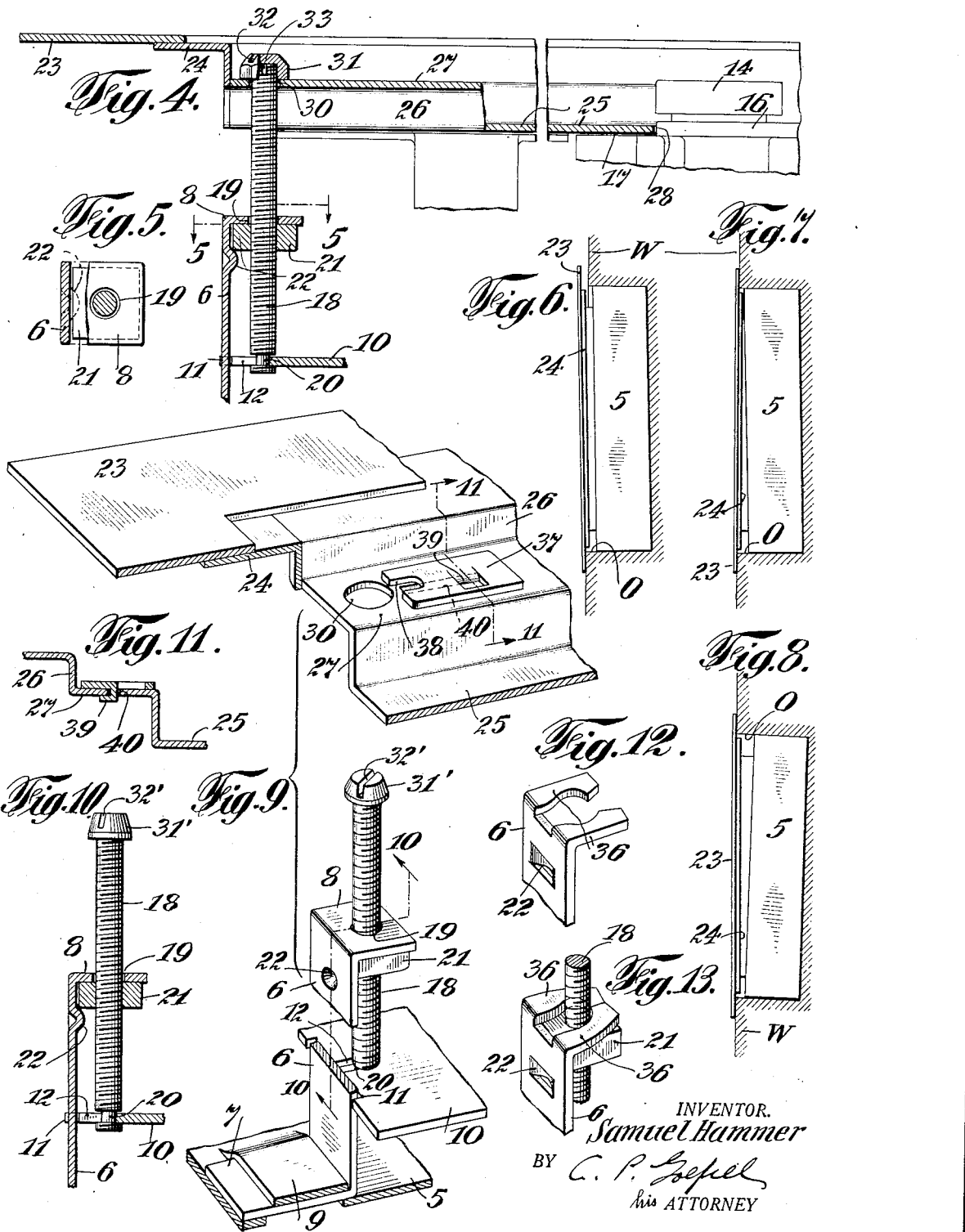
INVENTOR.
Samuel Hammer
BY C. P. Goepel
his ATTORNEY Patented Mar. 31, 1936

2,036,044

UNITED STATES PATENT OFFICE 2,036,044

ADJUSTABLE MOUNTING FOR ELECTRICAL CIRCUIT CUT OUT OR METER PANELS

Samuel Hammer, Brooklyn, N. Y., assignor to United Metal Box Co. Inc., Brooklyn, N. Y., a corporation of New York Application February 11, 1931, Serial No. 514,989

13 Claims. (Cl. 247—10)

This invention relates to an adjustable mounting for electrical circuit cut-out or meter panels, and more particularly to an enclosed type of panel wherein means is provided for adjustably positioning the panel and the parts mounted thereon with respect to a trim plate extending over the opening or recess of the wall in which the panel is arranged and upon the surrounding wall face.

It is the primary object and purpose of my present invention to provide an adjusting means for such small enclosed type cut-out or meter panels which provides for a relatively wide range of adjustment, and is capable of easy and quick operation to secure the meter panel and the trim plate in accurately adjusted relation to each other and which avoids the necessity of the exerc'se of precision and a high degree of skill in the mounting of a panel box or enclosure during the course of erection of the building and before the wall structure is completed or finished.

It is another important object of the invention to provide adjustable connecting means between the panel, the relatively fixed supports therefor and the trim plate which is more or less flexible or yieldable and will automatically accommodate itself to a non-parallel relation between the base of the mortise or recess or the panel box wall and the face of the building wall so as to nevertheless, permit of the proper adjustment to produce a substantially rigid relationship between the panel and the trim plate and to insure tight contact of the latter against the wall face around the mortise or recess.

It is also a further object of my invention to provide adjusting means for the above purpose which is so constructed that in tightening or clamping the trim plate against the wall face, all danger of chipping or breaking the porcelain fuse block carried by the panel will be obviated.

A secondary object of the invention is to provide an adjusting means of this character which consists of relatively few parts or elements of such mechanical form and construction as to facilitate the proper assemblage thereof in relation to the panel and the fixed supports therefor without requiring the exercise of special skill.

With the above and other objects in view, the invention consists in the improved adjustable cut-out or electric meter panel as will be hereinafter more fully described, illustrated in the accompanying drawings, and subsequently incorporated in the subjoined claims.

In the drawings, wherein I have disclosed one simple and practical embodiment of my present invention, and in which similar reference characters designate corresponding parts throughout the several views,—

Figure 1 is a front elevation showing the door of the panel box or enclosure in open position and illustrating the trim plate thereof as applied in connection with a panel having a multiple fuse block and two series of switches associated therewith;

Fig. 2 is an enlarged vertical sectional view taken substantially on the line 2—2 of Fig. 1;

Fig. 3 is a view similar to Fig. 2, the trim plate being removed;

Fig. 4 is an enlarged fragmentary sectional view illustrating one of the adjusting devices;

Fig. 5 is a detail sectional view taken on the line 5—5 of Fig. 4;

Figs. 6 and 7 illustrate an application of the panel box or enclosure by means of my invention wherein the base of the box or wall recess is out of parallel relation to the face of the wall, Fig. 6 showing the relation between the trim plate and the wall face before the final adjustment is made;

Fig. 8 is a similar view, but illustrating a reverse inclination of the panel box with respect to the wall face to that shown in Figs. 6 and 7;

Fig. 9 is a fragmentary perspective view of the trim plate and a part of the adjusting means before assemblage and showing a slightly modified form of said adjusting means;

Fig. 10 is a detail sectional view illustrating the latter construction, taken on line 10—10 of Fig. 9;

Fig. 11 is a sectional view taken on the line 11—11 of Fig. 9, and

Figs. 12 and 13 are detail perspective views showing a further modification of a part of the device.

In the embodiment of the invention which I have selected for purposes of illustration, there is shown a box or enclosure 5 for the cut-out or meter panel. Such enclosures are usually provided for the smaller sizes of panels, and are usually constructed of sheet metal. It is customary, in the erection of a building to mount these boxes, together with the panel in the position they are intended to occupy in the completed wall structure, but before the wall material is laid or applied in building up the wall structure. As the open side of the box or enclosure must be covered by a trim plate, after the wall is finished, and the fuse plugs and switches of the panel must be accessible through this trim plate, it is necessary to provide a means for relatively adjusting the panel and the trim plate which will insure a proper contacting relation of the marginal edges of the trim plate against the face of the building wall. Attempts have heretofore been made to provide such an adjusting means, which however, have not been wholly successful, and in those instances where the device has been commercially developed, the range of adjustment was comparatively limited and could be accomplished only with considerable difficulty. Moreover, in cases where, after completion of the building wall, it was found that the box or enclosure and the face of the wall were not disposed in parallel planes, the adjusting device was wholly ineffective to produce the necessary tight contact between the trim plate and the wall face. My present invention is designed with a view to overcoming such difficulties.

To the above end, I provide the fixed supporting members 6, which in this instance, are illustrated in the form of metal bars of somewhat less length than the depth of the box 5 and having their opposite end portions angularly bent or extended in relatively opposite directions as indicated at 7 and 8 respectively. These supports 6 are arranged within the four corners of the metal box or enclosure 5 and their ends 7 are fixed to the base wall of said box in any preferred manner. For purposes of illustration, I have shown this base wall of the box as having the strap portions 9 struck inwardly therefrom, and between which and the box wall, the angular ends 7 of the supports 6 may be readily inserted.

The panel comprises a metal plate 10 of rectangular form, the upper and lower edges of which are provided adjacent each corner of the plate with the recesses shown at 11. A slot 12 is also cut in the plate 10 in association with each of the recesses 11, said slot extending substantially at right angles to the recess and opening at one of its ends into said recess.

For purposes of illustration, I have herein shown a block of porcelain or other insulating material 13 suitably fixed upon one side of the plate at the center thereof, said block having a plurality of threaded sockets or receptacles to receive the fuse plugs indicated at 14. I have shown two series of such fuse plugs, and in association with each series of said plugs, a series of switches 15 corresponding in number is mounted upon the plate 10. However, it will of course, be understood that this is not essential, and if desired, a separate mounting may be provided for these switches. It is to be noted that the part of the insulating block 13 in which the fuse plugs 14 are received, projects from the surface of the body of said block, such projecting portion 16 of the block being therefore, surrounded by the shoulder indicated at 17.

Each of the adjusting rods or screws 18 is threaded substantially throughout its length and the angular end 8 of each support 6 is provided with an opening 19 of comparatively large diameter through which one of these adjusting screws is loosely positioned. Adjacent to one of its ends, the adjusting screw 18 is reduced in diameter or provided with an annular groove 20 therein which is of somewhat greater width than the thickness of the plate 10. Therefore, as clearly shown in the drawings, it will be understood that this reduced part of the screw may be readily inserted into the open end of the slot 12 and moved into the inner end of said slot so that the end portion of the screw at one side of said groove has bearing engagement against the under side of the plate 10.

Upon each screw 18 a nut 21 is threaded, said nut being positioned beneath the angular end 8 of one of the supports 6 and loosely held in position with respect thereto by the projection 22 on the support 6 which extends over one side of said nut.

The trim member includes a rectangular metal frame plate 23 which is of the requisite dimensions to overlap the face of the wall as shown at W at the edges of the opening O within which the box or closure 5 is positioned. Along the upper and lower edges of the opening bounded by the plate 23, I have shown angle bars 24 having one of their flanges welded or otherwise suitably secured to the inner face of said plate. The plate 25 extending between the opposite vertical side portions of the frame 23 substantially closes the frame opening. This plate 25 also has its opposite vertical side edges welded or otherwise fixed to the inner face of the frame plate 23 and at its upper and lower edges is in closely contacting relation to the inwardly projecting flanges of angle bars 24. In inwardly spaced relation from each side of the frame 23, the plate 25 is transversely offset as at 26 and is then flanged to provide the angular vertically extending ribs or shoulders 27 so that the part of the plate 25 between said shoulders is positioned in a plane substantially offset from the plane of the frame plate 23 and in parallel relation with the latter. This inner part of the plate 25 is centrally provided with an opening indicated at 28 to accommodate the fuse plugs 14 and the projecting part 16 of the receptacle block 13. Above and below this opening 28, the plate 25 is also provided with a series of slots or small rectangular openings indicated at 29 to accommodate the manually operable members of the several switches 15. As will be hereinafter appreciated, the depth of the ribs or shoulders 27 on the plate 25 in relation to the adjusting means is an important feature of the device.

Each of the vertical ribs or shoulders 27 of the plate 25 at the upper and lower ends thereof is provided with an opening indicated at 30 through which one of the adjusting screws 18 is loosely received. As clearly shown in Fig. 4 of the drawings, a bonnet nut 31 is threaded upon the outer end of each screw 18 and is adapted for contact against the surface of the shoulder 27. The closed end of the nut 31 has a groove or kerf 32 therein to receive the bit of a screw-driver. Similarly, the ends of the screws 18 may be provided with kerfs as indicated at 33 to receive the screw-driver bit for the purpose of adjusting the panel relative to the supports 6 before the trim member is applied. It will be noted that the nuts or heads 31 of the screws 18 do not project beyond the opposite side edges of the plate 25 but are positioned in the plane of the offsets 26. Thus, the door shown at 34 which is suitably hinged as at 35 to the upper side of the trim member will not be obstructed in its movement to closed position so that said door when fully closed, will be located within the plane of the trim plate 23. While this arrangement is preferable, it is of course not essential, insofar as the novel features of my adjusting means is concerned.

I have found that the use of the nuts 21 above referred to is preferable to tapping or threading the openings 19 of the supports 6, as these nuts may be procured in large quantities at insignificant cost, and enable the parts to be more readily assembled and provide for greater flexibility in the adjusting means. To this end also, and especially in order to enable the parts to be readily assembled by unskilled labor, instead of merely providing the arm 8 with the cylindrical opening, I may split or bifurcate this arm as indicated in Figs. 12 and 13, to provide the two integrally connected portions 36. After the rods or screws 18 with the nuts 21 assembled thereon are positioned between the split ends of the supports 16, these end portions 36 may then, by means of a pair of pliers or other simple tool, be readily pinched inwardly or forced together as shown in Fig. 13 so as to retain the rod or screw in assembled relation with the supporting member. Flexibility in the operating connection between the screws 18 and the panel with respect to the box or enclosure 5 is augmented by the fact that the several supports 6 are more or less yieldable with respect to the walls of the box.

Also, while I prefer to use the separate bonnet nuts 31 for the purpose of adjusting the rods or screws, if desired, I may provide the ends of these screws with the integrally formed heads 31' having the slots 32' to receive the bit of the screw-driver. In this case, as shown in Fig. 9, the opening 30 will be of relatively large diameter for the passage of the head 31' therethrough, and a latch plate shown at 37 is mounted on the shoulder 27 for sliding movement and is provided at one of its ends with the open slot 38 to receive the shank of the screw 18 beneath the head 31', whereby the trim member will be retained in connection with the adjusting screw. Any desired means may be employed for slidably retaining the plate 37 on the shoulder 27, but as one convenient means for this purpose, I have shown the angular tongue 39 struck from the plate 37 and loosely engaged for sliding movement in a longitudinal slot 40 in the wall of the shoulder 27.

Having above described the several structural parts of my present invention, the operation thereof may now be explained as follows.

Assuming that the box or enclosure 5, together with the adjustable panel have been mounted in the wall structure, and said wall structure completed and having its surface properly plastered or otherwise finished, it only remains to complete the installation to apply the trim member carrying the door or closure 34. The several adjusting rods or screws 18 are now successively turned and threaded outwardly through the nuts 21, thus moving the panel supported by the members 6 in an outward direction relative to the open side of the box or enclosure 5. The trim member is then disposed over the open side of the recess or opening O in the wall so that the outer ends of the adjusting screws 18 are received through the openings 30 in the plate 25 and moved inwardly with respect to the screws until the part of the plate surrounding the opening 28 therein is in abutting contact upon the surface or shoulder 17 of the fuse block 13. In this position of the trim member, its marginal frame plate 23 will be spaced from the surface of the wall W. The bonnet nuts 32 are now threaded upon the outer ends of the screws 18. By then applying the bit of the screw-driver to these nuts and continuing the turning movement in the same direction, the screws 18 are threaded inwardly through nuts 28. The trim member follows this inward movement until the plate 23 thereof comes into bearing contact against the face of the wall W. The depth of the rib or shoulder 27 of plate 25 with relation to the depth of the sockets or threaded recesses of the nuts 31 is such that at this time, and with plate 25 bearing on shoulder 17 of the fuse block 13, there is a slight space between each of the nuts 31 and the plate 25 so that upon further turning movement of rods 18, the panel is moved a slight further distance towards the base of the box or enclosure 5, thus disengaging shoulder 17 of the fuse block from the rear side of the plate 25 as the nuts 31 come into bearing contact against the outer face of said plate. Thus, upon further turning stress on the screws 18, the nuts 31 acting against plate 25 cause the marginal frame plate 23 of the trim member to exert a close frictional clamping contact against the face of the wall W around the recess or opening O therein. Therefore, it is evident, that in such final adjustment of the trim member to engage its flange or frame 23 against the wall face, there is no pressure exerted by the plate 25 against the porcelain fuse block, thus avoiding chipping or cracking of the block surface at the edge of the projecting part 16 thereof, and insuring a definite predetermined relation between the exposed outer surface of this part 16, and the front surface of the plate 25.

One of the very important advantages of my new adjustable panel mounting, resides in its comparatively great flexibility. Thus, in the event that after completion of the wall, it is found that the vertical plane of the box or enclosure 5 and the panel mounted therein, is not in parallel relation with the surface of the wall W, it is nevertheless possible to apply the trim member and insure a tight or close contact of its marginal frame plate 23 with the face of the wall. By reason of such flexibility in the mounting of the panel, an appreciable range of adjustment of each of the screws 18 independently of the other is possible. Thus, I have shown in Fig. 6 such a non-parallel relation of the box and the panel with the wall face with the trim member applied. The two lower screws 18 have been adjusted and the lower edge of frame 23 tightened or clamped against the face of the wall so that said frame plate is in substantially parallel relation with the panel and the box 5, and therefore, has its upper edge portion spaced from the face of the wall W. The two upper screws 18 are then adjusted until the frame plate 23 at its upper edge is finally brought into contact with the face of the wall. In such final adjustment, owing to the loose mounting of the screws 18 and nuts 21 with respect to the supports 6 and the loose connection of said screws with the plate 10, there is sufficient flexibility in such connections to permit the panel to assume a position within the box or enclosure 5 out of parallel relation to the vertical plane thereof, thus maintaining the desired parallelism between the plate 25 and the panel base 10 and between the front surface of said plate and the surface of the projecting part 16 of the fuse block 13. In Fig. 8, I have shown a similar condition but with the box or enclosure 5 disposed at a reverse inclination with respect to the wall surface, as shown in Figs. 6 and 7. It will be understood that in these figures the non-parallel relation between the face of the wall and the panel box, is somewhat exaggerated, and in actual practice may seldom be so pronounced.

When it is desired to remove the trim member in order to afford access to the fuse block and switch terminals or for the purpose of making other repairs, it is only necessary to unthread the nuts 31 from the ends of the screws 18. In the event that in tightening these nuts against the trim member, they may have become jammed on the ends of the screws, in the initial reverse turning movement, the screws 18 may thread outwardly through the nuts 21. However, this will result in frictional binding contact of the inner ends of these screws against the base plate 10 of the panel sufficient to hold the screws against such turning movement so that in continued turning effort on the nuts 31, they will be unthreaded from the ends of the screws. It is then only necessary to move the trim member outwardly away from the wall face to afford free access to the interior of the panel box.

From the above description considered in connection with the accompanying drawings, the construction, manner of use and numerous advantages of my improved adjustable panel mounting will be clearly and fully understood. It will be evident that the several flexibly mounted adjusting screws can be easily and quickly operated by the use of the ordinary screw-driver so as to quickly tighten the trim member against the wall face and at the same time automatically adjust and position the panel with respect to said trim plate and in relation to the base wall of the box or enclosure 5 and also regardless of the fact that said panel box may be positioned in the wall structure in a plane which is more or less out of parallel relation with the face of said wall. My invention therefore, provides an efficient and serviceable adjusting means for such small electric cut-out or meter panels which may be easily and quickly installed in the erection of the building, without necessitating careful calculation, or the use of a high degree of skill. It is further to be noted that the several parts of the manually adjustable means are of very simple mechanical form, may be easily and quickly assembled and possess maximum durability. The device may obviously also be produced on a quantity production basis, at comparatively low manufacturing cost.

While I have herein shown and described several practical and satisfactory forms of the essential features of my improved panel adjusting means, it is nevertheless to be understood that the same might also be produced in various other alternative structural forms, and I accordingly, reserve the privilege of resorting to all such legitimate changes therein as may be fairly embodied within the spirit and scope of the invention as claimed.

I claim:

1. In combination with a circuit cut-out or meter panel adapted for arrangement in a wall opening and a trim member to engage the face of the wall around said opening; means for adjustably mounting the panel, including a plurality of independently adjustable devices each comprising a threaded rod connected at one of its ends with the panel, a relatively fixed part in which the rod is threaded, the other end of the rod extending through an opening in the trim member, and a part on the latter end of the rod retaining the panel and trim member in assembled relation, said part and the rod being operable as a unit after the trim member is engaged with the wall face to adjustably position the panel relative to said trim member and engage said part with the latter to force said trim member into close contact with the face of the wall.

2. In an adjustable mounting for circuit cut-out or meter panels, a panel box open on one side, a panel within said box having a fuse block thereon, a cover for the open side of the box provided with an opening in its wall to receive a projecting part of the fuse block, and means for adjusting said panel relative to the box, said means comprising independently adjustable threaded rods loosely connected at one of their ends with said panel, supports for said rods fixed with respect to the panel box, and each of said rods carrying a part operable as a unit therewith to coact with the box cover and secure the latter in closed position simultaneously with the final adjustment of the panel to dispose the fuse block out of bearing contact with the box cover.

3. In an adjustable mounting for circuit cut-out or meter panels, a box or enclosure adapted for arrangement in an opening in a building wall, a panel therein having a base and fuse block thereon, means for adjusting said panel relative to the box including a plurality of members fixed to the base wall of the box and slidably guiding said panel base, a threaded adjusting rod associated with each of said members and having threaded engagement in a relatively stationary part, each of said members having means cooperating with said parts to retain the same in flexibly associated relation therewith, and means for connecting each of said rods with the panel base whereby the latter may assume positions in planes out of parallel relation with the base wall of the box in the independent adjustment of said rods.

4. In an adjustable mounting for circuit cut-out or meter panels, a box or enclosure, a panel therein having a base, a plurality of threaded adjusting rods for said panel, members mounted in relatively stationary positions between the panel base and the open side of the box and in which said rods are threaded, means for loosely connecting said rods at one of their ends with the panel base to permit said base to assume positions in planes out of parallel relation with the base wall of the box in the independent adjustment of said rods with respect to said members, a cover for the open side of the box, said rods at their other ends extending through openings in said cover, said cover also having an opening to receive a projecting part of the fuse block on the panel, and removable bonnet nuts on the latter ends of said rods rotatable as a unit with the rods and cooperating with the cover to secure the same against the face of the building wall over the open side of the box in the final adjustment of the panel to position the fuse block thereon relative to said cover.

5. In an adjustable mounting for circuit cut-out and meter panels, a panel box adapted to be arranged in an opening in the building wall, a panel having a base and a fuse block thereon arranged within said box, means for adjusting the panel relative to the box including a plurality of threaded rods loosely connected at one of their ends with the panel base, supports fixed with relation to the box and slidably guiding the panel base, a nut having threaded engagement on each rod, means retaining said nuts in flexibly connected relation with the respective supports, a cover and trim member for the open side of the box having a part to engage the face of a building wall, said cover having an opening therein to receive a projecting portion of the fuse block, the other ends of said rods projecting outwardly through the cover, and means on the latter ends of the rods operable as a unit therewith to cooperate with the cover and secure the trim portion thereof against the face of the building wall in the final adjustment of the panel to position the projecting part of the fuse block with respect to the outer face of the cover.

6. In an adjustable mounting for circuit cutout and meter panels, a panel box adapted to be arranged in an opening in the building wall, a panel having a base and a fuse block thereon arranged within said box, means for adjusting the panel relative to the box including a plurality of threaded rods loosely connected at one of their ends with the panel base, supports fixed with relation to the box and slidably guiding the panel base, a nut having threaded engagement on each rod, each of the supports having an angularly disposed split end portion embracing and loosely confining the rod at one side of the nut, means on the support cooperating with the nut at the opposite side thereof to hold the same against axial movement on the rod, a cover and trim member for the open side of the box having a part to engage the face of a building wall, said cover having an opening therein to receive a projecting portion of the fuse block, the other ends of said rods projecting outwardly through the cover, and means on the latter ends of the rods operable as a unit therewith to cooperate with the cover and secure the trim portion thereof against the face of the building wall in the final adjustment of the panel to position the projecting part of the fuse block with respect to the outer face of the cover.

7. In combination with a circuit cut-out or meter panel adapted for arrangement in a wall opening and a trim member to engage the face of the wall around said opening; a support between said trim member and the panel, means for connecting and adjusting the panel and trim member with respect to said support, including a rod adjustable on the support and rotatably mounted at its opposite ends in the panel and trim member respectively, and an operating member for said rod detachably engaged with the latter end thereof and cooperating with the trim member to clamp the same against the wall face in the final adjustment of said panel relative to the support.

8. In combination with a casing adapted to be mounted on a wall, a panel, and a trim member adapted for contact at its periphery with the face of the wall around said casing; means for effecting a universal adjustment of the panel within the casing from the exterior of the trim member, said means comprising yieldable panel supporting means mounted in the casing and permitting angular displacement of the panel relative to the casing walls, and operating means connected to the panel, adjustably coacting with said supporting means, and having means accessible from without the trim to simultaneously adjust and position the panel and trim with respect to the casing and wall.

9. In combination with a casing adapted to be mounted on a wall, a panel, and a separate trim member adapted for contact at its periphery with the face of the wall around said casing; means for effecting a universal adjustment of the panel within the casing from the exterior of the trim member, and to cause said trim member to contact throughout its periphery with the wall face, said means including a support extending from a wall of the casing, and operating means mounted on the support and connected to said trim member and to the panel to retain the same in assembled relation with each other, said operating means being accessible from without the trim and adjustably coacting with said support, to simultaneously adjust the panel and trim with respect to the casing and wall.

10. In combination with a casing adapted to be mounted on a wall, a panel in the casing and a separate trim member to engage the face of the wall around said casing; a plurality of adjusting devices for the panel and trim member, each including a support extending from a wall of the casing, and operating means connected to said trim member and the panel mounted upon and, adjustably coacting with said support and comprising a part accessible from without the trim, operable to cause said operating means to simultaneously and independently adjust the panel and trim to their final positions with respect to the casing and wall.

11. In combination with a casing adapted to be mounted on a wall, a panel in the casing and a separate trim member of greater dimensions than the casing; means for effecting a universal adjustment of the panel and trim member with respect to the casing and wall after mounting the casing on the wall, said means including a plurality of spaced supports fixedly connected at one of their ends to the casing and yieldable with respect thereto from their normal positions, and operating means mounted upon and adjustably coacting with each of said supports, accessible from without the trim and having spaced parts engaging the panel and trim respectively, to simultaneously adjust said panel and trim with respect to the casing and wall.

12. In combination with a casing adapted to be mounted on a wall, a panel in said casing and a separate trim member to engage the face of the wall around said casing; means for effecting a universal adjustment of the panel and trim member with respect to the casing and wall, to cause said member to contact throughout its periphery with the wall face, said means including a support extending from a wall of the casing, and operating means connected to said panel and to the trim member, movably mounted upon said support, and comprising a part accessible from without the trim and operable to initially simultaneously adjust the panel and trim as a unit, to position the latter relative to the wall face, and thereafter independently adjust said panel and position the same within the casing relative to said trim.

13. In combination with a panel and cover plate adapted to be mounted with said panel in a wall opening and the cover plate engaging the edges of said opening at its periphery; means for effecting a universal adjustment of the panel and cover plate with respect to the wall opening, said means including a fixed support, and operating means movably mounted upon the support, connected to the cover plate and to the panel, and comprising a part accessible from the outer side of the cover plate, for actuating said operating means whereby the panel and cover plate are simultaneously adjusted and positioned relative to said support and the wall opening.

SAMUEL HAMMER.